REMOTELY CONTROLLED RECEIVER RESPONSIVE ONLY TO FUNDAMENTAL MODULATION FREQUENCY
Filed March 28, 1962
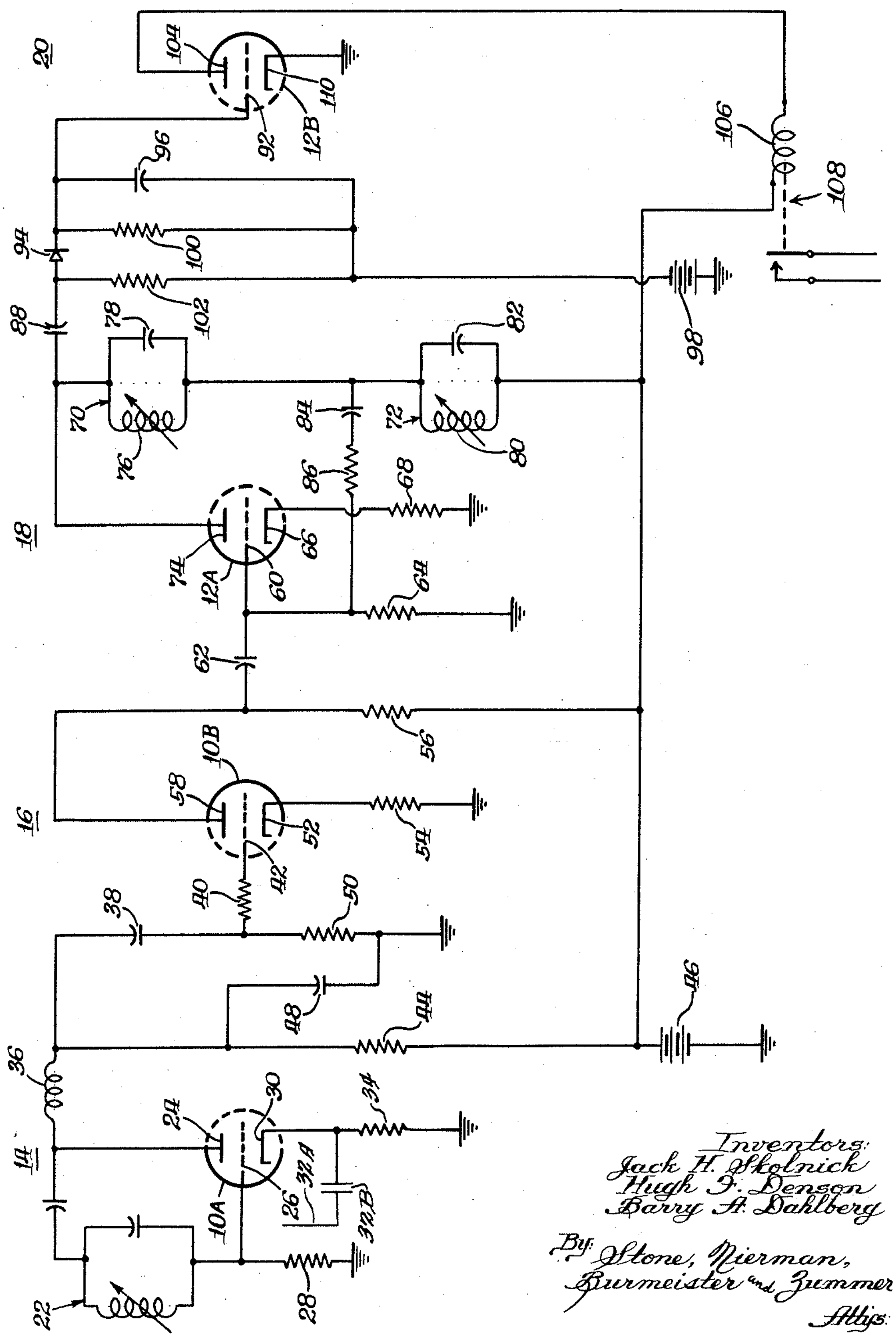
Inventors:
Jack H. Skolnick
Hugh F. Denson
Barry A. Dahlberg
By: Stone, Zierman, Burmeister and Zummer
Attys.

United States Patent Office 3,133,252

Patented May 12, 1964

3,133,252

REMOTELY CONTROLLED RECEIVER RESPONSIVE ONLY TO FUNDAMENTAL MODULATION FREQUENCY

Jack H. Skolnick and Hugh F. Denson, Chicago, and Barry A. Dahlberg, Palos Heights, Ill., assignors to A.R.F. Products, Inc., River Forest, Ill., a corporation of Illinois Filed Mar. 28, 1962, Ser. No. 183,111
3 Claims. (Cl. 325—393)

The present invention relates generally to devices for remote control, and more particularly to a receiver adapted to respond to a transmitter and actuate a relay.

There has been an extensive development in the art of radiant energy control systems with particular emphasis on the control of garage doors, and the like. Patent Number 1,760,479 to Colman discloses a device conceived in the 1920's which utilizes a spark gap oscillator for the purpose of opening garage doors.

Radio communication devices have been found to have the disadvantage of unreliability in that they tend to respond to electrical disturbances in the communications range, such as radiations resulting from electronic devices for scientific, industrial, and medical use, as well as other electrical disturbances, both natural and man-made. In addition, radio communication devices must comply with the Federal Communications Commission regulations, or be of a type excluded from these regulations.

An induction type remote control unit which was developed to overcome the difficulties of radio communication type units is disclosed in Patent Number 2,695,977 to Hupert and Patent Number 2,695,951 to Hupert. Induction type remote control devices are highly reliable, but require the transmitter to be relatively close to the receiver. It is one of the objects of the present invention to provide a remote control receiver which is capable of responding to a radio frequency transmitter or microwave transmitter with a reliability which approaches an induction type remote control device.

One of the mechanisms by which the reliability of a remote control device may be improved is to provide a keying signal for actuation of a receiver. The keying signal may either interrupt the transmitter or may impress a modulation signal on the carrier of the transmitter, Patent No. 2,844,683 to A. H. Maciszewski, et al., discloses a keying and coding device for this purpose. Patent No. 3,001,066 to Naber et al., discloses another type of transmitter which provides coded emission.

The frequency of the signals radiated by the transmitter is itself one coding signal. In addition, at least one other coding should be applied to the signal in order to prevent actuation of the receiver by a transmitter operated for the purpose of actuating some other remote control unit. This second coding may be achieved by means of modulation of the carrier frequency. It is a further object of the present invention to provide a receiver for use with a transmitter which generates modulated signals and which has a reliability approaching mechanically keyed units.

If a remote control transmitter radiates signals of periodic modulation with a wave shape departing from the precisely sinusoidal shape, there is a likelihood that the receiver will respond to signals of the same carrier frequency but modulated at one-half of the receiver's coding frequency. Even if the modulation of the transmitter is truly sinusoidal, such occurrence is still very likely since the base band frequency stages of the receiver are likely to generate the second harmonic of that transmitter modulation frequency which would then coincide with the coding frequency of the receiver. It is a further object of the present invention to provide a receiver for use with a periodically modulated transmitter which will respond to the fundamental frequency of modulation but not the sub-harmonic of this frequency.

These and further objects of the present invention will become readily apparent to those skilled in the art from a further consideration of this disclosure, particularly when viewed in the light of the drawing which is a schematic electrical circuit diagram of a receiver embodying the present invention.

The receiver illustrated in the figure is intended for use in a fixed location and utilizes two vacuum tubes. It is to be understood that the receiver may be designed for portable use as well, and may be designed for transistors instead of vacuum tubes.

Each of the vacuum tubes has two triode sections designated 10A and 10B, and 12A and 12B, respectively. The triode section 10A is connected in a super-regenerative detector circuit 14. The triode section 10B is connected in an amplifier circuit 16, and the triode section 12A is connected in a second amplifier circuit 18. The triode section 12B is connected in a relay switching circuit 20.

A tank circuit 22 is connected between the plate 24 and grid 26 of vacuum tube section 10A, the grid 26 being grounded through a grid resistor 28. The cathode 30 of vacuum tube section 10A is connected to ground through a resistor 34. An antenna 32A in the form of a straight rod is coupled to the cathode 30 through a capacitor 32B. Typical operating frequencies for the receiver are in the range of 220 to 300 megacycles.

The output of the detector 14 represents the modulation of the received signal, and since the transmitter associated with the receiver illustrated in the figure amplitude modulates its carrier periodically, the output of the detector 14 is in the form of a periodically varying alternating current signal. Preferably modulating signals from five kilocycles per second to one hundred kilocycles per second are generated in the transmitter, and therefore the output of the detector 14 is a periodic signal with a frequency in the range from five kilocycles to approximately one hundred kilocycles, although it is to be understood that other modulation frequencies may also be utilized. The reason for utilizing modulation frequencies of the above range is that they are above the audio frequencies generally encountered, avoid bulk in the equipment, and are less costly than very low frequency devices.

The output from the detector 14 is taken from the plate 24 of vacuum tube section 10A through a capacitor 38 and grid resistor 40 and impressed upon the grid 42 of vacuum tube section 10B. A plate resistor 44 is connected to the junction between the choke 36 and capacitor 38 and to the positive terminal of a battery 46, or other source of direct current power. The negative terminal of the battery 46 is connected to ground, and the junction between the choke 36 and capacitor 38 is also bypassed to ground by a capacitor 48. A grid resistor 50 is connected between the junction of the capacitor 38 and resistor 40 and ground, and the cathode 52 of vacuum tube section 10B is connected to ground through a cathode resistor 54.

A plate load resistor 56 is connected between the positive terminal of the battery 46 and the plate 58 of vacuum tube section 10B, and the plate 58 is connected to the grid 60 of vacuum tube section 12A through the capacitor 62. The grid 60 is also connected to ground through a grid resistor 64, and the cathode 66 of vacuum tube section 12A is connected to ground through a cathode resistor 68. The plate load for vacuum tube section 12A comprises two serially connected tuned circuits 70 and 72 connected to the plate 74 of vacuum tube section 12A and to the positive terminal of the battery 46. The tuned circuit 70 comprises a coil 76 of variable inductance and a capacitor 78 connected in parallel with the coil 76, and this tuned circuit 70 has a resonant frequency corresponding to the modulation frequency of the transmitted control signal. The tuned circuit 72 also has a variable inductance 80 connected in parallel with the capacitor 82, and this tuned circuit 72 has a resonant frequency which is one-half of that of the tuned circuit 70. A feedback link comprising a capacitor 84 and a resistor 86 is connected between the grid 60 of vacuum tube section 12A and the junction between the tuned circuits 70 and 72.

The output of amplifier 18 is taken from across the tuned circuit 70, and a capacitor 88 is connected to the plate side of the tuned circuit 70. The capacitor 88 is connected to the grid 92 of vacuum tube section 12B through a diode 94 connected to make positive potential appear at the grid. A capacitor 96 is connected from the grid 92 to the negative terminal of a bias battery 98, the positive terminal of the bias battery 98 being connected to the common ground. A resistor 100 is connected in parallel with the capacitor 96, and a resistor 102 is connected between the junction of the capacitor 88 and diode 94 and the negative terminal of the battery 98.

The plate 104 of vacuum tube section 12B is connected to the coil 106 of a relay 108, the other end of the coil 106 being connected to the positive terminal of battery 46. The cathode 110 of vacuum tube section 12B being connected to the common ground.

The detector 14 receives the signal from the transmitter associated with the receiver and demodulates that signal. As a result, a periodically varying alternating potential is applied to the grid 42 of amplifier 16, amplified and applied to the grid 60 of amplifier 18. Since the tuned circuit 70, which constitutes a part of the plate load of vacuum tube section 12*a*, presents a high impedance to the modulation frequency, a substantial potential develops across the tuned circuit 70. The tuned circuit 72, however, is not resonant at the frequency of the modulation, and therefore this parallel resonant circuit presents a relatively low impedance at this frequency and very little voltage develops across this tuned circuit 72. As a result, very little feedback through the capacitor 84 and resistor 86 reaches the grid 60 of vacuum tube section 12A. The substantial potential developed across the tuned circuit 70 is therefore rectified by the diode 94 and impressed upon the grid 92 of vacuum tube section 12B. This increase in potential on the grid 92 of vacuum tube section 12B is effective to increase the current flowing through the plate circuit of the tube and to close the relay 108.

If a signal having this same carrier frequency but a modulation frequency one-half of the modulation frequency to which the receiver is to respond is impressed upon the antenna 32A, the detector 14 will operate in the same manner described above, and will demodulate this signal and impress upon the grid 42 of the amplifier 16 a periodically varying alternating potential which is at a frequency of resonance of the tuned circuit 72. This periodically varying alternating potential is amplified by the amplifier 16 and the amplifier 18, and impressed upon the plate load of the amplifier 18. The resonant circuit 72 presents a high impedance to this alternating current signal, since it forms a parallel resonant circuit at this frequency. As a result, a substantial potential develops across the resonant circuit 72. The tuned circuit 70, however, is not resonant at this frequency, and hence presents a relatively low impedance. As a result, the potential developed across the tuned circuit 70 as a result of this modulation frequency is relatively small. However, periodically varying potentials often contain or generate substantial second harmonic content after passage through a vacuum tube thus, the second harmonic of this modulation signal will develop a substantial potential across the tuned circuit 70. However, because of the fact that the signal developed across the tuned circuit 72 is fed back to the grid 60 of the vacuum tube section 12A, the fundamental frequency of the modulation is attenuated at the grid 60 of vacuum tube section 12A, thus resulting in a vacuum tube section 12A generating only an insignificant amount of second harmonic. Therefore, this modulation frequency is not effective to develop a potential across the tuned circuit 70 which will drive the switching circuit 20 and the relay 108.

The battery 98 is for the purpose of biasing the grid 92 of vacuum tube section 12B properly to select the threshold value at which the relay 108 closes. Resistor 100 and capacitor 96 provide a suitable time constant for permitting the rectified modulation voltage to leak from the grid 92.

It is to be noted that the feedback from the tuned circuit 72 to the grid 60 of vacuum tube section 12A is 180° out of phase with the fundamental frequency of the modulation potential impressed upon the grid 60 from the detector 14. This phase shift is accomplished by vacuum tube section 12A.

From the foregoing disclosure, those skilled in the art will readily devise many modifications of the present invention. It is therefore intended that the scope of the present invention be not limited by the foregoing disclosure, but rather only by the appended claims.

The invention claimed is:

1. A remote control receiver comprising a detector having an input circuit adapted to receive radio frequency signals modulated at a constant rate and an output circuit, a first amplifier having an input circuit coupled electrically to the output circuit of the detector and an output circuit, a second amplifier having an input circuit and an output circuit, the output circuit having electrically connected in series therewith the coil of a relay which actuates in response to electrical currents in excess of a threshold value, a series circuit including a diode, a first tuned circuit resonant at the fundamental modulation frequency, and a second tuned circuit resonant at a frequency one-half that of the first tuned circuit connected in series with the input circuit of the second amplifier, the first and second tuned circuit also being connected in series with the output circuit of the first implifier, and a negative feedback circuit electrically connected between the input circuit of the first amplifier and the junction between the first and second resonant circuits.

2. A remote control receiver comprising a detector having an input circuit adapted to receive modulated radio frequency signals and an output circuit, the signals being modulated at a constant frequency, a first amplifier having a vacuum tube with a plate, control grid, and cathode, said first amplifier having an input circuit extending between the grid and the cathode and coupled to the output of the detector, said first amplifier having an output circuit extending between the plate and the cathode including in series a first tuned circuit and a second tuned circuit, the second tuned circuit being tuned to a frequency one-half that of the first tuned circuit, a capacitor electrically connected between the junction of the first and second tuned circuits and the grid of said first amplifier, and a second amplifier having a vacuum tube with a plate, control grid, and cathode, a relay having a coil connected between the plate and cathode of said second amplifier tube, and a series circuit connected between the grid and cathode of said second amplifier tube including a diode and the first and the second tuned circuit.

3. A remote control receiver comprising the elements of claim 2 in combination with a resistor and a capacitor connected in parallel between the grid of the second amplifier and the cathode thereof.

References Cited in the file of this patent

UNITED STATES PATENTS

| | | |
|---|---|---|
| 2,407,074 | Green | Sept. 3, 1946 |
| 2,566,333 | Huntton | Sept. 4, 1951 |
| 2,724,049 | Rouault | Nov. 15, 1955 |
| 2,774,043 | Villard | Dec. 11, 1956 |